June 5, 1928.
B. OSHMAN ET AL
1,672,467
NURSING BOTTLE
Filed May 6, 1927
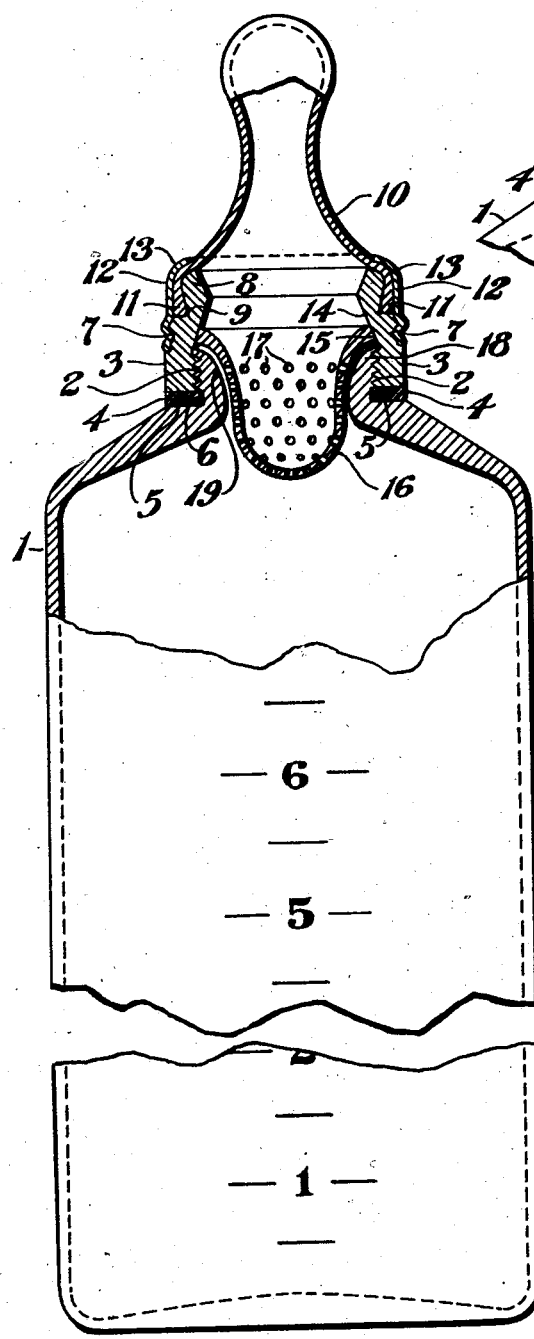
INVENTORS
Benjamin Oshman
David Oshman
BY
Benjamin Oshman
ATTORNEY Patented June 5, 1928.

1,672,467

UNITED STATES PATENT OFFICE.

BENJAMIN OSHMAN AND DAVID OSHMAN, OF NEW YORK, N. Y.

NURSING BOTTLE.

Application filed May 6, 1927. Serial No. 189,247.

This invention relates to nursing bottles, and its principal object is to provide a safety, sanitary, efficient and improved nursing bottle.

Another object is to provide a nursing bottle with a member which will positively maintain the nipple mounted in operative state while enabling or permitting renewal or interchangeability of the nipple proper with relation to said member, or without involving the loss or discarding of said member.

Other objects and advantages will hereinafter appear.

In the accompanying drawings,—

Fig. 1 shows a nursing bottle of this invention, with the improvements thereof shown in cross-sectional elevation.

Figs. 2 and 3 show details of the nursing bottle.

The usual nursing bottle 1 is provided with a threaded neck 2, over which is threaded a nut 3 that bears upon a gasket 4 which rests upon a ledge 5 of the bottle and projects into an annular groove 6. Said nut is provided with an exterior thread 7 and a rim 8 the outer wall of which tapers downwardly and thereby forms an annular groove 9. The nipple 10 is adapted to slip over the rim 8, and preferably its edge 11 is thickened so as to fill the cavity created by the groove 9. A tapped cap 12 is passed over the nipple and screwed over the thread 7, whereby its bent rim 13 bears upon the nipple 10 and presses the latter against the rim 8 to positively lock the nipple in operative condition. Should the rim 13 fail to hold the nipple forcibly enough the latter will remain maintained in locked state by the lodgement of its thickened edge or rim 11 within the groove 9 and between the rim 8 and the wall of cap 12. The nut 3 is provided with a tapered wall 14 against which is wedged a correspondingly tapered flange 15 forming part of a basket-like strainer 16 provided with a plurality of fine perforations 17, which strainer is thus frictionally held in projected condition within the bottle when the nut 3 and nipple 10 are in the mounted state shown in Fig. 1.

When using this nursing bottle, the infant feeds at the nipple 10 in the usual manner, and the milk filters through the strainer 16 before entering the nipple and is thereby fed without danger of contamination which might result from possible impurities in the milk. As the nipple is directly locked to the nut 3 and the latter is in turn screwed to the bottle-neck, any possibility of the nipple accidentally slipping off from the neck is precluded. The threading of the nut 3 against the gasket 4 produces a firm closure of the bottle, and any possible leakage is prevented. Should the nipple 10 get out of order or should it be desired to utilize a nipple of a different grade the same may be removed or interchanged by unthreading the cap 12, replacing the old nipple with the new, and screwing back the cap 12 into place. The bottle-neck 2 is preferably provided with a sharp rim 18 and its inner wall 19 preferably tapers downwardly into the bottle in the manner shown in Fig. 2, thereby preventing the accumulation of milk often occurring upon the ordinary rims of bottle-necks. When the nursing bottle and its parts are in detached condition for sterilization, storage, or other purposes, a cap 20 may be threaded over the bottle-neck 2 as shown in Fig. 2, and the bottle may be thereby effectively sealed and its interior maintained in cleansed sterilized state or until needed for further use. This cap may be also utilized for carrying along additional milk bottles for additional milk supply, in connection with which bottles the nipples 10 and the nut 3 may be interchangeably utilized.

Variations may be resorted to within the scope of the invention, and portions of the improvements may be used without others.

Having thus described our invention, we claim:—

1. A nursing bottle having a threaded neck, a tapped nut engaging said neck having an exterior thread, a nipple adapted to slip over a portion of said nut, and a cap threading over said exterior thread and securing said nipple to said nut.

2. A nursing bottle having a threaded neck, a nut threading over said neck, a nipple being slipped over a portion of said nut, and a cap engaging said nut to secure said nipple thereto.

3. A nursing bottle having a threaded neck, a tapped nut engaging said neck having an exterior thread, said nut having an annular grooved portion, a nipple having a thickened rim adapted to engage said portion, and a cap threading over said exterior thread and securing said nipple to said nut.

4. A nursing bottle having a neck, a nut engaging said neck having an exterior thread, a nipple adapted to slip over a portion of said nut, and a cap threading over said exterior thread and securing said nipple to said nut.

5. A nursing bottle having a neck, a nut engaging said neck, a nipple being slipped over a portion of said nut, and a cap engaging said nut to secure said nipple thereto.

6. A nursing bottle having a neck, a nut engaging said neck having an exterior thread, said nut having an annular grooved portion, a nipple having a thickened rim adapted to engage said portion, and a cap threading over said exterior thread and securing said nipple to said nut.

7. A nursing bottle having a threaded neck, a tapped nut engaging said neck having an exterior thread, a nipple adapted to slip over a portion of said nut, a cap threading over said exterior thread and securing said nipple to said nut, and a milk strainer within said bottle frictionally engaging said nut.

8. A nursing bottle having a threaded neck, a nut threading over said neck, a nipple being slipped over a portion of said nut, a cap engaging said nut to secure said nipple thereto, and a milk strainer within said bottle frictionally engaging said nut.

9. A nursing bottle having a neck the rim of which consists of a sharp exterior edge and the inner wall of which slopes downwardly and taperingly from said edge, a tapped nut engaging said neck having an exterior thread, a nipple adapted to slip over a portion of said nut, and a cap threading over said exterior thread and securing said nipple to said nut.

10. A nursing bottle having a neck the rim of which consists of a sharp exterior edge and the inner wall of which slopes downwardly and taperingly from said edge, a nut threading over said neck, a nipple being slipped over a portion of said nut, and a cap engaging said nut to secure said nipple thereto.

11. A nursing bottle having a neck the rim of which consists of a sharp exterior edge and the inner wall of which slopes downwardly and taperingly from said edge, a tapped nut engaging said neck having an exterior thread, a nipple adapted to slip over a portion of said nut, a cap threading over said exterior thread and securing said nipple to said nut, and a milk strainer within said bottle frictionally engaging said nut.

12. A nursing bottle having a neck the rim of which consists of a sharp exterior edge and the inner wall of which slopes downwardly and taperingly from said edge, a nut threading over said neck, a nipple being slipped over a portion of said nut, a cap engaging said nut to secure said nipple thereto, and a milk strainer within said bottle frictionally engaging said nut.

Signed at the city of New York, in the county of New York, and State of New York, this 2nd day of May A. D. 1927.

BENJAMIN OSHMAN.
DAVID OSHMAN.